United States Patent
Buchanan (10) Patent No.: US 11,049,415 B2
(45) Date of Patent: Jun. 29, 2021

(54) ANATOMIC APPARATUS AND TRAINING SYSTEM FOR REMOTE AND INTERACTIVE HANDS-ON SURGICAL TRAINING

(71) Applicant: Dental Education Laboratories, Inc., Santa Barbara, CA (US)

(72) Inventor: L. Stephen Buchanan, Santa Barbara, CA (US)

(73) Assignee: Dental Education Laboratories, Inc., Santa Barbara, CA (US)

( * ) Notice: Subject to any disclaimer, the term of this patent is extended or adjusted under 35 U.S.C. 154(b) by 314 days.

(21) Appl. No.: 15/781,255

(22) PCT Filed: Dec. 5, 2016

(86) PCT No.: PCT/US2016/065022
§ 371 (c)(1),
(2) Date: Jun. 4, 2018

(87) PCT Pub. No.: WO2017/096404
PCT Pub. Date: Jun. 8, 2017

(65) Prior Publication Data
US 2019/0005850 A1 Jan. 3, 2019

Related U.S. Application Data

(60) Provisional application No. 62/262,866, filed on Dec. 3, 2015.

(51) Int. Cl.
*G09B 23/28* (2006.01)
*B33Y 80/00* (2015.01)

(52) U.S. Cl.
CPC ............ *G09B 23/283* (2013.01); *B33Y 80/00* (2014.12)

(58) Field of Classification Search
CPC ...... G09B 23/28; G09B 23/283; G09B 23/30; B33Y 80/00
See application file for complete search history.

(56) References Cited

U.S. PATENT DOCUMENTS

2007/0178429 A1  8/2007  Bell
2014/0099616 A1*  4/2014  Hussam ................ G06Q 50/24
                                              434/262
(Continued)

FOREIGN PATENT DOCUMENTS

JP    S56153360 A   11/1981
JP    H11249548 A    9/1999
(Continued)

OTHER PUBLICATIONS

Nakagwadental Clinic's Website, "Medical Information, 3D printer", Aug. 26, 2015, Publisher: URL,https://web.archive.org/web/20150826131115/, https://www.nakagawa-dental.jp/html/medical/3d.html.

(Continued)

*Primary Examiner* — Timothy A Musselman
(74) *Attorney, Agent, or Firm* — GableGotwals (57) ABSTRACT

A training system for dental procedures having a training device and a self-assessment for use with the training device is described. The training device is printed with a 3D printer and includes a predetermined anatomic form of at least a portion of a human jaw structure and a predetermined anatomic form of at least one human tooth structure. Part of the printed human tooth structure is rooted in the printed human jaw structure, and both structures are designed to have at least one analogous physical property to their corresponding human structures. The self-assessment includes a pictorial array of procedural outcomes of a procedural step so that a user can identify which image in the pictorial array best represents the user's own procedural (Continued)

outcome of the procedural step performed by the user on the training device and at least one feedback instruction.

10 Claims, 5 Drawing Sheets

(56) References Cited

U.S. PATENT DOCUMENTS

| | | | |
|---|---|---|---|
| 2014/0106327 A1* | 4/2014 | Hemmer | G09B 23/283 434/267 |
| 2014/0329217 A1* | 11/2014 | Barsness | G09B 23/285 434/272 |
| 2017/0106327 A1* | 4/2017 | Sadasivan Vijayakumari | C07C 7/005 |

FOREIGN PATENT DOCUMENTS

| | | |
|---|---|---|
| JP | 2003088537 A | 3/2003 |
| JP | 2004046102 A | 2/2004 |
| JP | 2006314580 A | 11/2006 |
| JP | 2008310276 A | 12/2008 |
| JP | 2011002786 A | 1/2011 |
| JP | 2014516169 A | 7/2014 |
| JP | 2015208361 A | 11/2015 |
| WO | WO 2012156287 A1 | 11/2012 |

OTHER PUBLICATIONS

Gizmodo, "Tooth made with 3D printer is too real and scary", Mar. 15, 2015, Publisher: URL,https://www.gizmode.jp/2015/03/3d_174.html.

\* cited by examiner

ANATOMIC APPARATUS AND TRAINING SYSTEM FOR REMOTE AND INTERACTIVE HANDS-ON SURGICAL TRAINING

BACKGROUND OF THE INVENTION

This invention relates to surgical training systems and apparatuses for dentists.

To date, there are no replicable, anatomically realistic models for surgical dental training, which is one of the greatest challenges in dental education. Students are currently limited to practice on molded plastic training models of teeth that fit in plastic jaw models, extracted teeth, some combination of training models and extracted teeth, and patients. The models and extracted teeth, while beneficial, have many drawbacks to their use. Training on human patients offers the danger of procedures gone awry due to the unskilled clinician providing the service.

In the new world of 3D printing seemingly everything is possible. However, like the Internet of twenty years ago, the applications of this technology are being worked out day by day to address the specifics of each imagined use. This patent application describes an innovation that furthers the ability to authentically reproduce human anatomy in printed training replicas for dental professionals.

All surgical skills to date have required neophyte surgeons to practice on human patients with oversight from trained colleague preceptors. There are two significant deficits in this method of procedural training. First, this process inescapably involves learning by failures as well as successful clinical outcomes, many times with serious consequences to the patients who have been used in this teaching environment. Second is the severe limitation of a one-on-one requirement to transfer these procedural skills, making it exorbitantly expensive as well as exclusive in the limited numbers of professionals who are able to acquire these skills.

The advent of multi-ink 3D printers offers an elegant solution to these worldwide problems: the possibility of replicating human anatomy in ways that can authentically mimic the procedural experiences surgeons require to become competent in their fields. These anatomic replicas reduce the patient mortality and morbidity usually attendant to this activity by taking humans out of the learning process every procedural clinician must go through to achieve competence in their given field of expertise. At the same time, the replicas allow the training of a much larger number of clinicians which can reduce the costs and availability of dental procedures.

Dentistry, specifically endodontics, has been served through the replication of external and internal tooth anatomy—see e.g. U.S. patent application Ser. No. 14/017,225, Anatomic Apparatus and Training System for Remote and Interactive Hands-On Procedural Training for Dentists, incorporated by reference herein—by way of 3D printing. 3D printing is uniquely capable of reproducing the nuances of root canal morphology, a process that injection molding cannot adequately accomplish as there is no way to recreate the microscopic and often tortuous anatomy inside of human and animal teeth.

3D printing of individual teeth has significantly improved the educators' ability to transfer endodontic skills to clinicians. However, there is also a need for repeatable, realistic endodontic training in tooth replicas that are mounted in jaw sets with simulated gingival tissues. Dental students need to repeatedly practice dental procedures, in the same context they will encounter in practice and with the same anatomic challenge, until that skill is repeatable. Educators need full knowledge of the anatomy their students are working in so that they can effectively improve their clinical skills. There is also a need to teach dental procedures remotely or in large groups to make procedural training more affordable and more accessible through internet training.

SUMMARY OF THE INVENTION

A training system for dental procedures having a training device and a self-assessment for use with the training device is described. The training device is printed with a 3D printer and includes a predetermined anatomic form of at least a portion of a human jaw structure and a predetermined anatomic form of at least one human tooth structure. Part of the printed human tooth structure is rooted in the printed human jaw structure, and both structures are designed to have analogous physical properties to their corresponding human structures. The self-assessment includes a pictorial array of procedural outcomes of a procedural step so that a user can identify which image in the pictorial array best represents the user's own procedural outcome of the procedural step performed by the user on the training device. The self-assessment also includes at least one feedback instruction based on the user's identification.

A method for making the training device is also described. Steps of the method include segmenting the different anatomic structures of a portion of a human jaw structure, using a 3D printer to print each anatomic structure, and then assembling the printed anatomic structures into a jaw section. These training devices offer simulated soft tissues that can be incised, reflected, and sutured, replicated bone tissues that can be contoured, grafted, and implanted into, and simulated root structures that can provide procedural training to endodontic specialists who want to establish or improve root end surgical skills.

DETAILED DESCRIPTION OF THE INVENTION

A training device made according to this invention is useful for remote and hands-on training in a variety of dental practice areas. 3D printing is used to replicate whole sections of a patient's jaw in order to train dentists in different surgical methods. The jaw sections are printed with materials simulating gingival soft tissues, bone, the medullary soft tissue inside boney trabecula, tooth roots and crowns, pulp tissue, and periodontal ligaments. Depending on the surgical method to be applied, the teeth and/or jaw sections may include diseased tissue. In all cases, the anatomy of each training device is selected to present one or more anatomic structures or challenges encountered in dental practice and, because subsequent copies of each training device are exact copies of the first, to provide a realistic example of that structure for repeated practice by a single student or to all students in need of practice on that structure.

All of the components of the training device can be printed simultaneously. Alternatively, the components may be printed individually or in parts and then assembled into one jaw section. The 3D printing may be done by any method known in the art, and is preferably done in accordance with U.S. patent application Ser. No. 14/017,225, which is incorporated herein by reference.

Figure 1:
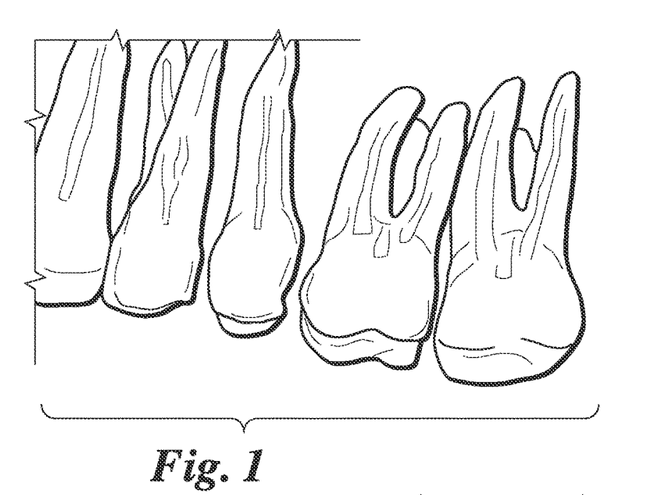
FIG. 1 illustrates a segment of an anatomic structure comprising the canals, roots, and crowns of the teeth.
Figure 2:
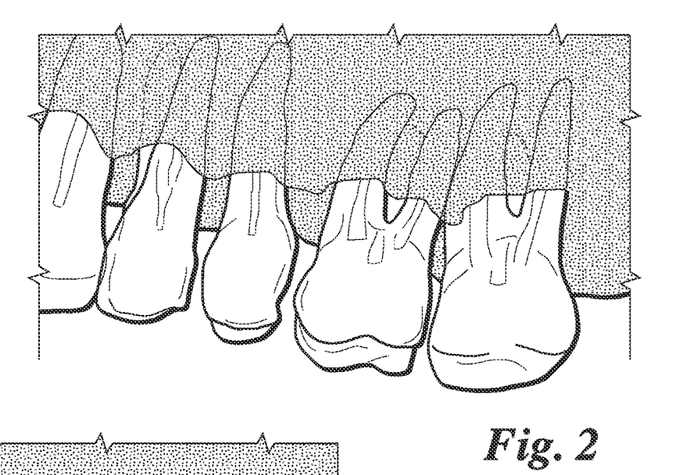
FIG. 2 illustrates a second segment of an anatomic structure comprising the periodontal ligament ("PDL"), overlaying the structure of FIG. 1.
Figure 3:
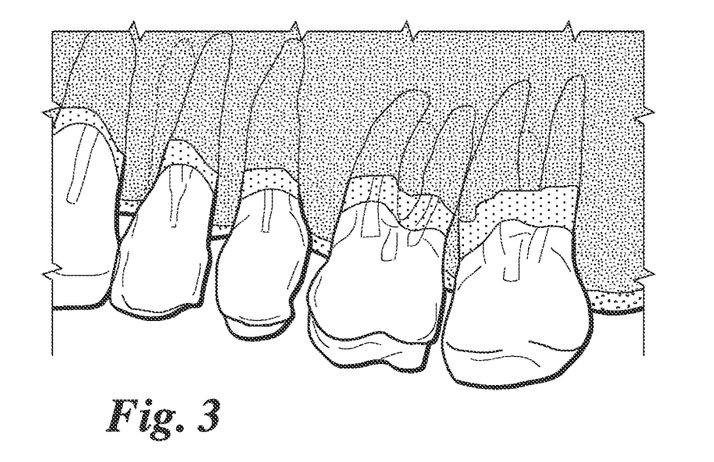
FIG. 3 illustrates a third segment of an anatomic structure comprising the bony structures of the jaw, overlaying the structure of FIG. 2.
Figure 4:
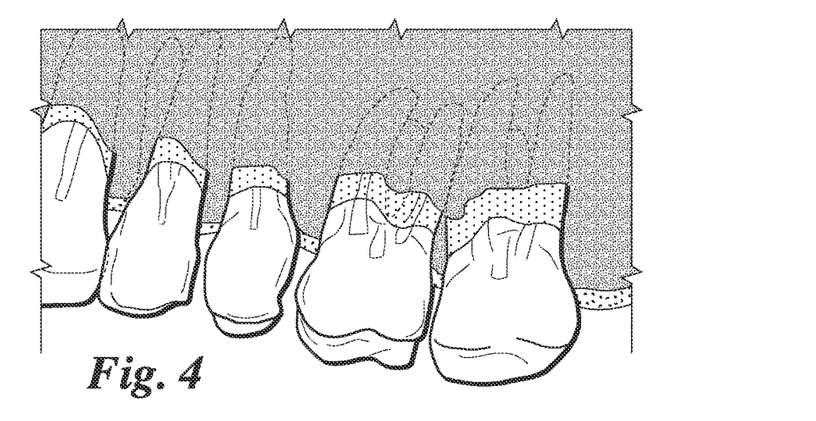
FIG. 4 illustrates a fourth segment of an anatomic structure comprising the soft gingival tissues, overlaying the structure of FIG. 3.
Figure 5:
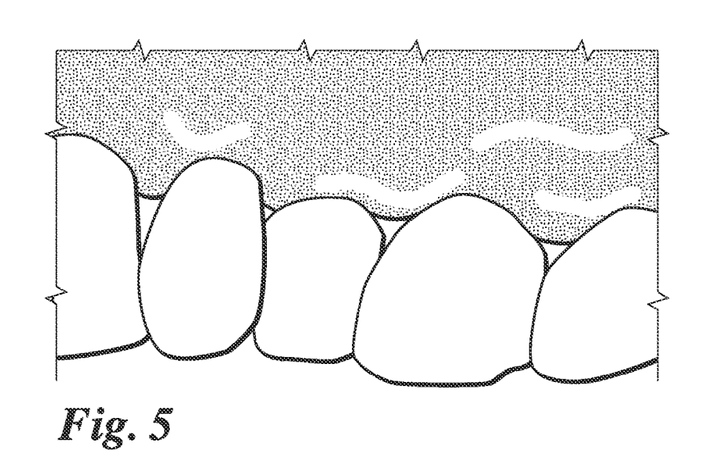
FIG. 5 illustrates an embodiment of the invention, printed from the segmented CT dataset in FIGS. 1-4.

Because several different materials are needed to replicate hard and soft tissues, printing a complete jaw section requires more preparation and a more sophisticated printer than printing individual teeth. In addition, before printing can occur, each of the different anatomic structures to be represented must be segmented from the full CT volume. In other words, a computer-savvy anatomist must discriminate between the different structures. As an example, the canals, roots, and crowns of the teeth are segmented together in FIG. 1, followed by the periodontal ligament ("PDL") in FIG. 2, the bony structures in FIG. 3, and the soft gingival tissues in FIG. 4. FIG. 5 shows the 3D-printed surgical replica from the segmented CT dataset in FIGS. 1-4.

Each component of the training device may be transparent or translucent (i.e., non-opaque), radio-opaque, or opaque, depending upon the training objective to be achieved. For example, in the training device of FIG. 5, the soft tissues are modeled with a clear, rubber-like material that is colored with a red felt-tip marker. Like the TRUETOOTH™ replicas (Dental Education Laboratories, Santa Barbara, Calif.), the material of the teeth of the training device is softer than dentin, so handpiece burs are run at half speed to better replicate the tactile feedback from cutting bone tissues.

Once printed, the training devices may be mounted in jigs and positioned just as patients are positioned during dental treatment. Dentists and dental students can do various procedures on them, including but not limited to, incisions, implant placement, osteotomy, apicsection of roots, retro-instrumentation and retro-filling of the ends of root canals, bone grafting and suturing, and tooth extraction and replacement with dental implants. When the procedure is complete, the student can remove the training device from the jig and examine his or her results. Because the anatomic structure of the training device is repeatable, the student or practitioner can repeat the procedure, with the exact same anatomy, as many times as necessary to master the technique. Because each training device has known anatomy, its use allows for complete standardization of grading. In addition, for Board and qualification testing, the training device may be secured so that it cannot be removed from the jig by the person performing the procedure.

Figure 6:
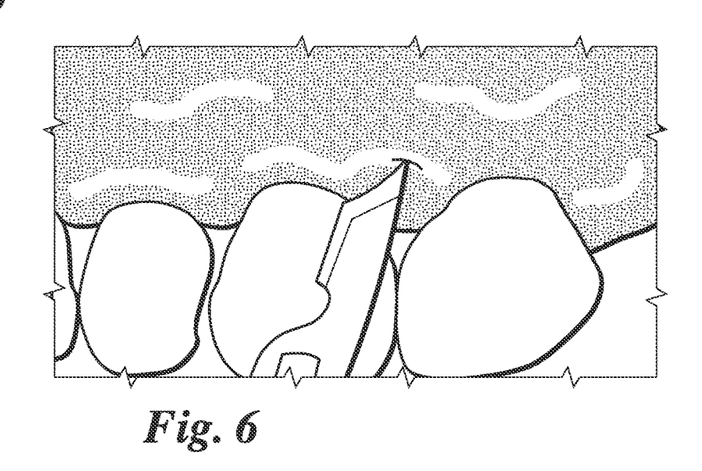
FIG. 6 illustrates an incision of the soft tissues of the embodiment of FIG. 5.
Figure 7:
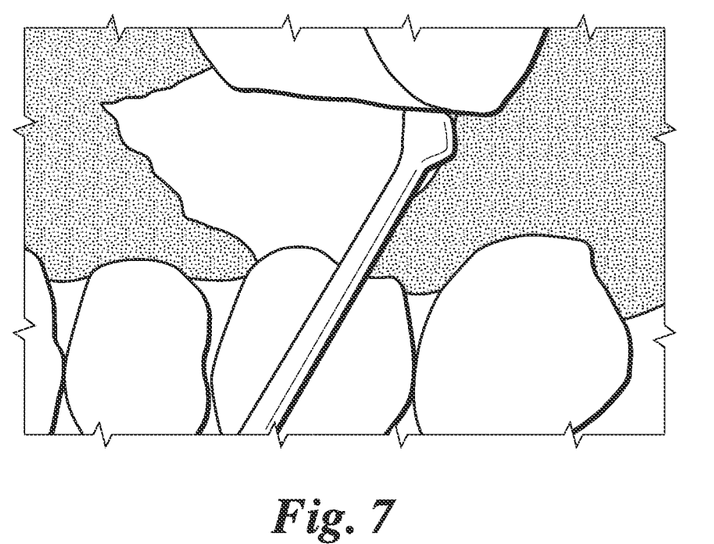
FIG. 7 illustrates the use of a periodontal elevator to reflect the incised tissue of FIG. 6.
Figure 8:
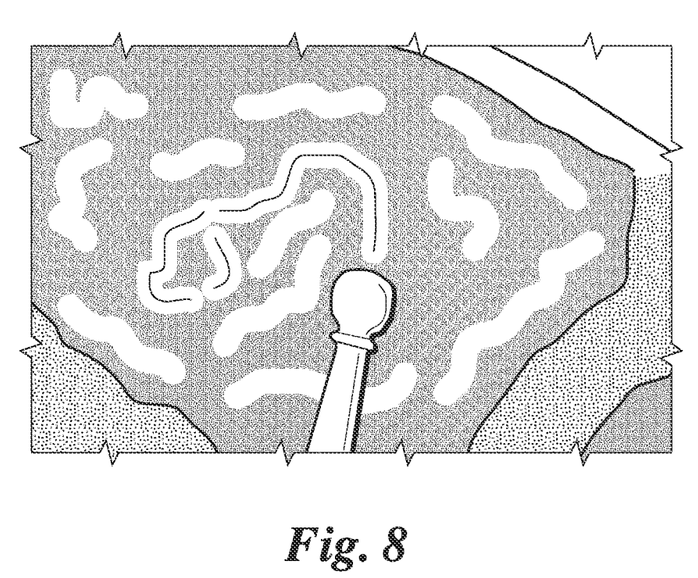
FIG. 8 illustrates a cut through the bony structures of the embodiment of FIG. 5 to reveal the mesiobuccal ("MB") root.
Figure 9:
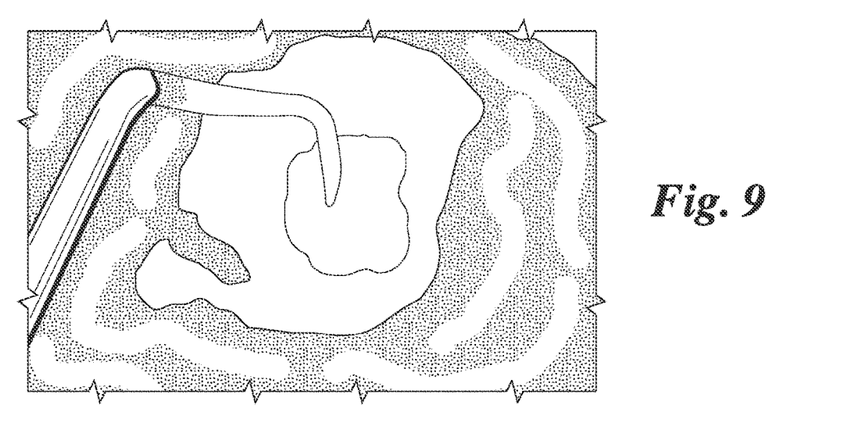
FIGS. 9-10 illustrate additional cuts through the bony structures of the embodiment of FIG. 5 to reveal the MB1 and MB2 canal ends.
Figure 10:
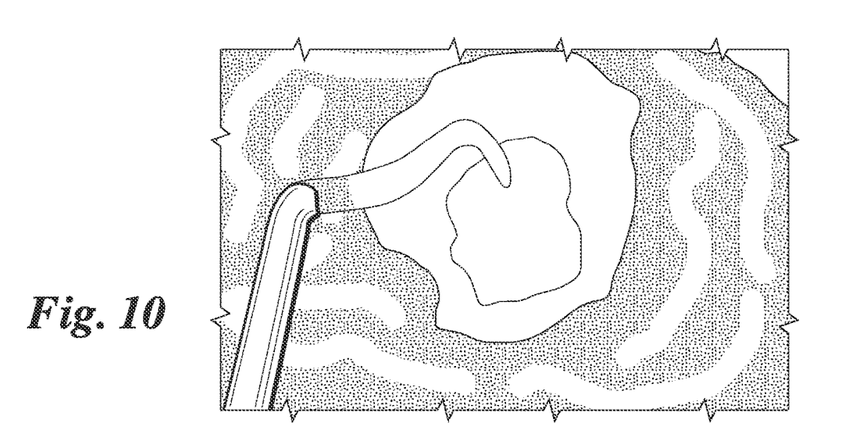
Figure 11:
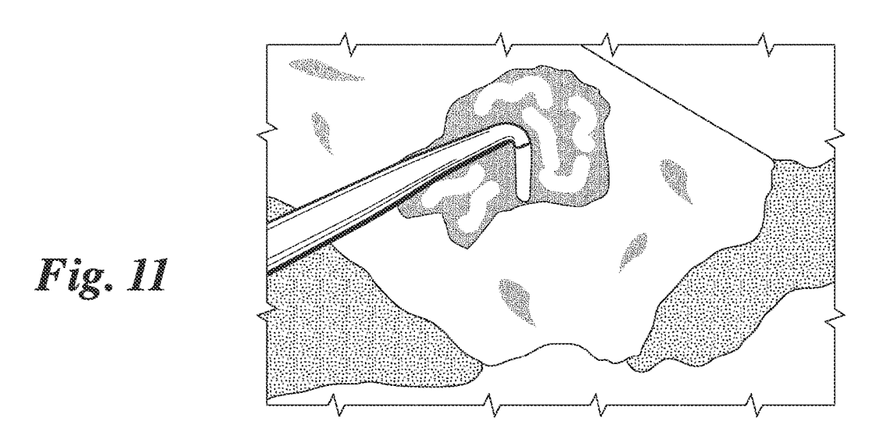
FIG. 11 illustrates the use of an ultrasonic retro-prep tip to prepare the MB1 and MB2 canal ends for filling.
Figure 12:
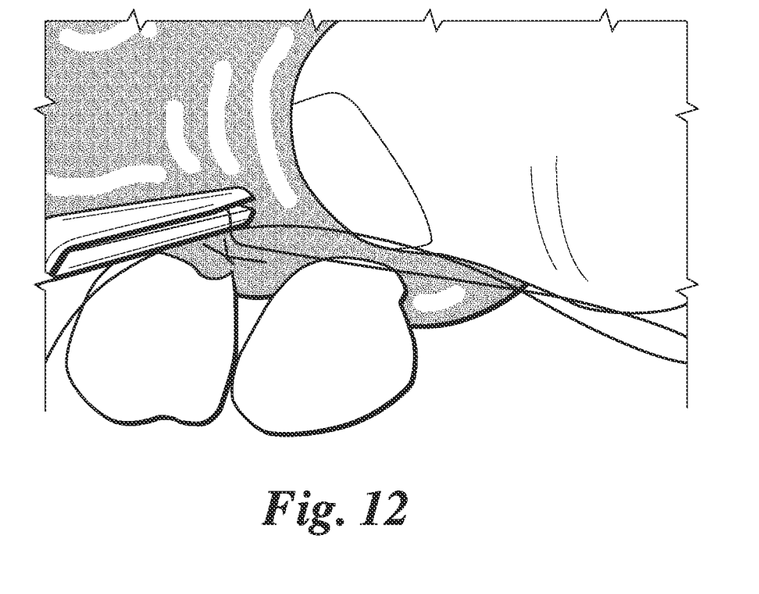
FIG. 12 illustrates the suturing of the soft tissues to close the surgical flaps of FIG. 6.
Figure 13:
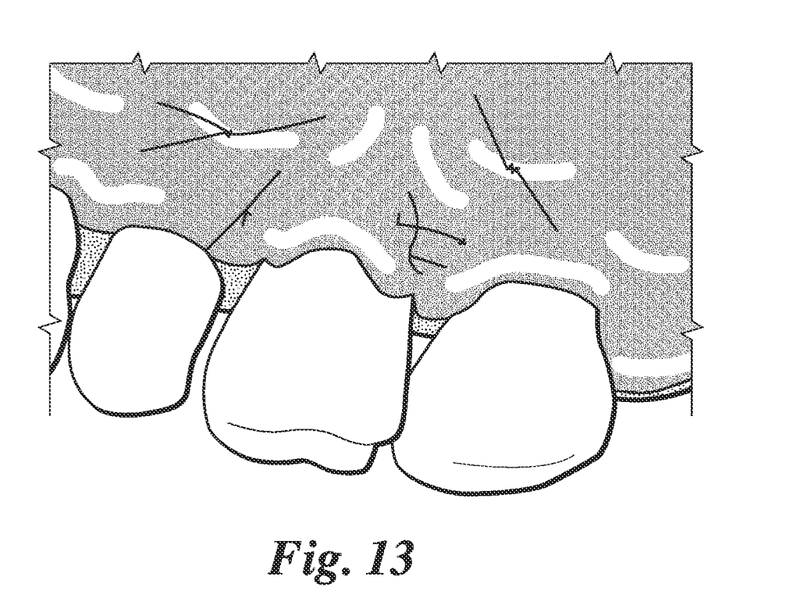
FIG. 13 illustrates the surgical flaps after they have been closed by suturing as shown in FIG. 12.

As an example, the material selected for the training device shown in FIG. 5 can be incised with a standard 15C blade, as shown in FIG. 6, and then reflected with a periodontal elevator, as shown in FIG. 7. In FIG. 8, the clinician or student has cut through the replicated bone to reveal the mesiobuccal ("MB") root end of the MB canal. Further osseous access reveals the MB1 and MB2 canals in the simulated cut root surface, as shown in FIGS. 9-10, after which an ultrasonic retro-prep tip is used to prepare the canal ends for filling, as shown in FIG. 11. Suturing the soft-tissue material to close the surgical flaps is shown in FIGS. 12-13, which accurately simulates the experience of performing the procedure on patients. Other embodiments and uses of the printed training device for the purpose of surgical training include the following examples: trabecular bone modeling; periodontal sulcus modeling; periodontal pockets of different depths; incisable gingival tissues; tooth replica extraction and an extraction socket; lingual soft tissue flap reflection; buccal soft tissue flap reflection; bone graft with PTFE membrane under lingual flap; suturing bone graft and PTFE membrane; completed socket preservation; measurement of extracted tooth replica; immediate implant selection to replace extracted tooth replica and implant placement with prepped implant abutment; incision for apical surgery; ultrasonic root end preparation; delivery of retrofill, bone graft in retrofill site, suturing of flap after retrofill.

Dissolvable, softer polymer materials may be used (see e.g. U.S. Pat. No. 8,822,590 B2 to Hermes et al.) used in conjunction with harder polymer materials as part of the final 3D-printed model. The softer polymer is designed to be dissolvable with NaOCl or NaOH solution to simulate the dissolution of certain materials during the procedure.

Even the simpler objective of teaching dental students how to cut and restore operative preparations can be improved by use of this invention. While operative procedures, unlike root canal procedures, are directly visualized during their accomplishment, these anatomic replicas allow educators to expose students to all of the specific anatomic variations of teeth to be restored, including the various amounts and locations of carious lesions or fractures they may encounter in clinical practice. Educators may use the training devices to show students the many variations of adjacent teeth that must be considered. Because this method provides exactly repeatable replicas, educators can plan their instruction with full knowledge of the anatomy that each student will encounter, and multiple students can experience the same procedure at the same time, thereby facilitating training compared to all previous means of teaching dental surgical procedures. Alternatively, the same student may repeatedly practice the same procedure in the same anatomic form until competence has been achieved. Training devices may also be printed so that the student can repeat the same procedure on different anatomies or anatomies at various levels of difficulty.

The training devices may be used to teach dental concepts and procedures in large groups, thereby reducing the cost and improving access to procedural training. The training device may also be printed so that it is larger than the corresponding human jaw section. The larger jaw section may be used as teaching aids to train clinicians or to explain dental procedures to patients. Finally, the training device may be used for research purposes. The training device may be improved by having temperature control means (such as heating elements) to bring the device to body temperature, gauge devices, or data collection means. One or more surfaces of the training device may also be optically flattened and polished to enhance microscopic visualization.

A training device made according to this invention also makes it possible for students and practitioners to learn via distance yet still retain a hands-on learning experience. An array of possible procedural outcomes can be presented to students by print, video, interactive computer, or interactive computer over the internet so they may self-assess their outcomes. Based on this self-assessment, the student either goes back to review previously presented course material, followed by repeating the procedural step in another training device, or continues on to the next step.

The system can employ computer means that guide a user through the course and presents training modules that practitioners can work through in their own operatory with their own assistants. Each of the training modules are led by interactive video. The student or practitioner can watch a training module, practice the technique being explained and demonstrated by the module, and then self-access and compare the results of his or her technique for a particular anatomy with visual examples ranging from incorrect to ideal. For certification purposes, radiographs of the training device after completion of the procedure may be submitted for official grading. Additionally, a practitioner could make a radiograph of a particular patient's jaw and teeth anatomy, select a training device that closely represents the anatomical challenges presented by that anatomy, and practice on the training device and grade her or his performance prior to performing the actual procedure.

A preferred user interface for a web-based system made according to this invention includes a home page for an Internet site with an icon or button for do-it-yourself/continuing education ("DIY/CE"). When a user clicks on the DIY/CE button, the user is taken to a page dedicated to this program. A video explaining the program in full may be provided.

The DIY/CE page includes a list of all the different training device offerings and provides the user with the opportunity to review each device. The page also provides an icon or button to purchase a particular training device (or set of devices) and its associated course or learning module. After an online payment method (e.g., PayPal) has draft-captured payment, a code is instantaneously e-mailed to the user in order for the user to gain access to the program, course, or module. The program provider is copied on this email in case the user loses his or her access code. After the user has received the training device (or set of training devices), the user enters the code and gains access to the program.

Once the code is entered, a video box appears below the training device in question. This initial video helps to introduce the actual model. Below this video are two separate videos. The first video sets expectations for the user (and for his or her assistant) and makes sure that he or she has the correct materials on hand to proceed with the course. The second video discusses the training device's anatomy and sets the stage for each individual interactive training module to follow. This video also provides guidelines for the user for regarding how to proceed. Each training module covers one or more specific steps of the selected procedure.

In the first training module, a video describes and demonstrates the ideal step or steps for the first part of the selected procedure. In one preferred embodiment, the first training module presents five example models or images "A" to "E", with "A" being perfect and receiving a score of 5 to "E" being poor and receiving a score of 1. In another preferred embodiment, the first training module presents three examples "A" to "C", with "A" being perfect and receiving a score of 5 and "C" being poor and receiving a score of 1. After the images are presented, the user is asked to perform the steps and, after performing them, selects the model that most closely resembles his or her results.

This "self-grading" process repeats throughout each of the sections. For example, after successfully completing the first part of the selected procedure for a particular anatomy, the next training module presents five models or images "A" to "E", the user performs the procedure, and then grades his or her results against the models. Although this self-grading does not count as a final grade for academic or continuing education credit, it does serve as a benchmark for the user as the user progresses through each section. For example, if the user clicks on "A" or "B" in the first section, a video appears instructing the user to go to the second training module. However, if the user clicks on any of the other models ("C" to "E") in the first section, a video appears which includes a review of the procedure and how to do things correctly. The user is then given another chance (or chances) to practice and grade her or his performance against the models.

Upon completion of all of the training modules, the user is given a cumulative score based upon the self-grading. For continuing education credit, the user can submit one or more radio-graphical images of the completed training device for official grading. Upon submission of the radio-graphical images, the user's course code is obsolete.

While the embodiment shown in FIGS. 1-42 has been printed with clear soft tissue and white bone and tooth structure, the training devices may be printed with one or more of the components having different colors. For example, soft tissue may be colored red, PDL and intra-trabecular medullary tissue polymers may be colored blue, teeth may be colored light yellow, and bone and enamel may be printed in white model medium. Further, while an anatomic apparatus and training system for remote and interactive hands-on surgical training for dentists have been described with a certain degree of particularity, many changes may be made in the structure and composition of the apparatus, the steps of the training system, and the order of the steps without departing from the spirit and scope of this disclosure. The invention, therefore, is limited only by the scope of the attached claims, including the full range of equivalency to which each element thereof is entitled.

What is claimed:

1. A training system for dental procedures, the training system including a training device being printed by a 3D printer and a self-assessment for use with the training device, the training device comprising
a predetermined anatomic form of at least a portion of a human jaw structure, the printed human jaw structure having at least one analogous physical property to a human jaw, and
a predetermined anatomic form of at least one human tooth structure, the printed human tooth structure having at least one analogous physical property to a human tooth, wherein a portion of the printed human tooth structure is rooted in the anatomic form of the printed human jaw structure;
the self-assessment comprising a pictorial array of procedural outcomes of a procedural step so that a user can identify which image in the pictorial array best represents the user's own procedural outcome of the procedural step performed by the user on the training device wherein inks used to print the predetermined anatomic forms of said portion of the human jaw structure and the at least one human tooth structure are selected to simulate colors of the corresponding analogous physical properties;

an ink used to print a first portion of the training device includes a polymer that is softer than an ink used to print a second portion of the training device and is dissolvable with NaOCl, the ink used to print the second portion includes a polymer that is harder than that of the ink used to print the first portion and is not dissolvable with the NaOCl.

2. A training system according to claim 1, wherein the portion of the human jaw structure is selected from the group consisting of gingival soft tissue, bone, medullary soft tissue inside boney trabecula, periodontal ligament, and diseased tissue.

3. A training system according to claim 1, further comprising a second training device, the second training device being printed by a 3D printer and having a different predetermined anatomic form that the predetermined anatomic form of the first-mentioned training device.

4. A training system according to claim 3, wherein the first-mentioned training device and the second training device are each selected to provide a different level of difficulty than the other.

5. A training system according to claim 1, wherein the pictorial array of procedural outcomes is presented in print form.

6. A training system according to claim 1, wherein the pictorial array of procedural outcomes is presented in video form.

7. A training system according to claim 1, wherein the pictorial array of procedural outcomes is presented by an interactive computer system.

8. A training system according to claim 1, wherein the pictorial array of procedural outcomes is presented by an interactive computer system over the internet.

9. A training system according to claim 1, further comprising at least one feedback instruction based on the self-assessment.

10. A training system according to claim 1, wherein the training device is one training device in a set of training devices being printed by a 3D printer, the set of training devices covering a range of predetermined anatomic forms.

* * * * *